US006998542B2

(12) United States Patent
Wallisch

(10) Patent No.: US 6,998,542 B2
(45) Date of Patent: Feb. 14, 2006

(54) SCALE

(75) Inventor: Gebhard Wallisch, Burladingen (DE)

(73) Assignee: Mettler-Toledo (Albstadt) GmbH, Albstadt (DE)

( * ) Notice: Subject to any disclaimer, the term of this patent is extended or adjusted under 35 U.S.C. 154(b) by 229 days.

(21) Appl. No.: 10/332,593

(22) PCT Filed: Jul. 12, 2001

(86) PCT No.: PCT/EP01/08080

§ 371 (c)(1), (2), (4) Date: May 13, 2003

(87) PCT Pub. No.: WO02/07118

PCT Pub. Date: Jan. 24, 2002

(65) Prior Publication Data

US 2004/0040753 A1 Mar. 4, 2004

(30) Foreign Application Priority Data

Jul. 13, 2000 (DE) ........................................ 100 34 034

(51) Int. Cl.
*G01G 19/40* (2006.01)

(52) U.S. Cl. ............................... 177/25.15; 177/25.19; 705/22; 705/414

(58) Field of Classification Search .................. 705/22, 705/414; 177/25.15, 25.19
See application file for complete search history.

(56) References Cited

U.S. PATENT DOCUMENTS 4,859,838 A * 8/1989 Okiharu ...................... 705/22
4,879,650 A * 11/1989 Kurimoto et al. ............. 705/21
2003/0177069 A1 * 9/2003 Joseph

FOREIGN PATENT DOCUMENTS

| | | |
|---|---|---|
| DE | 3147274 | 6/1983 |
| EP | 0152055 | 8/1985 |
| EP | 0720134 | 7/1996 |
| WO | 9404891 | 3/1994 |

OTHER PUBLICATIONS

Patent Abstracts of Japan, vol. 1999, No. 08, Jun. 30, 1999 & JP 11 086135 (Toshiba Tec KK), Mar. 30, 1999.

Patent Abstracts of Japan, vol. 017, No. 384 (P–1575), Jul. 19, 1993 & JP 05 062071 A (Mitsubishi Electric Corp), Mar. 12, 1993.

Patent Abstracts of Japan, vol. 1998, No. 13, Nov. 30, 1998 & JP 10 222769 A (Nitsuko Corp), Aug. 21, 1998.

* cited by examiner

*Primary Examiner*—Randy W. Gibson
(74) *Attorney, Agent, or Firm*—Friedrich Kueffner

(57) ABSTRACT

The invention relates to a device to be used for the sale of goods in a store. Said device comprises a unit for generating goods-related signals, a unit for generating identification signals, which represent the type of the goods to be sold, and comprises a display unit for generating a visual representation of information contents that are determined on the basis of the goods-related signals and/or identification signals. For generating a visual representation, the invention provides that the sales device is operated by quantity information that represents the present quantity of the goods of the type indicated by the identification signals.

12 Claims, No Drawings

SCALE

The invention pertains to a scale according to the introductory clause of claim 1, to a sales system realized with the use of such scales; and to a process for the visual representation of merchandise-specific information content during a sales transaction.

Scales of the type described above in the form of shop scales are known from, for example, WO 94/04,891 and EP 0 152 055 B1. In the case of the scales described in the publications just cited, weighing cells are used to generate merchandise-specific signals which indicate the weight of the merchandise, and the sale price of the weighed merchandise is then determined on the basis of the identification signals. For this purpose, in the case of the shop scale described in WO 94/04,891, identification signals indicating the type of weighed merchandise are generated by actuation of an input unit integrated into the display unit; on the basis of these signals, the base prices (prices per unit weight) for this merchandise are called up in turn from a data storage medium. The price of the weighed merchandise is then determined by multiplying the weight of the merchandise determined on the basis of the merchandise-specific weight signals by the base price called up on the basis of the identification signals; this price is then displayed on the display unit. The display unit also shows the base price of the merchandise and the weight itself. To facilitate the operation of the known scale, information content such as pictures of the merchandise or names representing the type of merchandise in question are displayed on the display fields corresponding to the input fields of the input unit integrated into the display unit. Sales transactions are thus greatly facilitated.

When several scales of the type described in WO 94/04,891 are used, a further facilitation of the sales transaction is achieved by combining these scales into a network according to EP 0 152 055 B1, in which sales data representing the sales transactions at the individual scales are recorded and evaluated by a central data processing system. As a result, the sales transaction itself is facilitated, because numerous jobs which would otherwise have to be performed by the sales personnel can be accomplished by the central data processing system. In addition, the overall organization of merchandise acquisition is also facilitated, and the sales transactions at the individual scales can also be monitored from a central location.

Nevertheless, it has been discovered during the use of the networks known from EP 0 152 055 B1 that delays frequently occur in the acquisition of merchandise, which lead to supply bottlenecks for certain groups of merchandise and to an oversupply of other groups of merchandise. The articles in oversupply thus cannot be sold before their shelf life expires.

In view of these problems of the state of the art, the invention is based on the task of providing a scale of the type described above which makes possible a further optimization of the sales transaction, on the task of providing a sales system produced with such scales, and on the task of making available a process for visually representing merchandise-specific information content during a sales transaction, which process can be carried out with the help of scales of this type.

With respect to the scales themselves, this task is accomplished by an elaboration of the known scales, which is characterized essentially in that the scale for generating visual representations can be operated on the basis of quantitative information representing the existing quantity of merchandise of the type indicated by the identification signals.

This invention is based on the insight that the problems which are observed when the known networks are used are attributable primarily to the fact that the data present in the central data processing system are used only sporadically to control inventory, because the central data processing system must usually perform numerous tasks, such as the updating of the data, the recording of sales data from individual sales stations and/or sales clerks, the calculation of turnover, etc. As a result of the inventive elaboration of the known scales, however, it becomes possible for the sales clerks themselves to monitor the inventory each time an individual item of merchandise is sold. When the sales clerk sells an individual item, checks the displayed merchandise information, and finds that only a limited amount of the merchandise of the type just sold is on hand, he/she can initiate the acquisition of new merchandise of the same type. In this case, the quantitative information can relate to the quantity of the merchandise in question still present at the sales station itself, to the quantity of the merchandise in question still on hand in the store, or to the quantity of the merchandise in question still available in an entire network of branch stores. In the two latter cases, the scale is advisably combined with other scales to form a network, where sales data are exchanged between the individual scales. The quantitative information can comprise numerical data on the weight still on hand or on the number of units still on hand. It is also possible, however, for the quantitative information to be displayed in the form of graphics and/or colored symbols. In this case, a first color can be shown to indicate that there is still a sufficient amount of merchandise on hand, a second color to indicate that there is not enough merchandise on hand, and a third color to indicate that there is an oversupply of the merchandise on hand, which means that sales-promoting measures must be taken.

It is advisable for the quantitative information to be displayed on the same display unit which is used for the visual representation of the information content determined on the basis of the merchandise-specific signals. It would also be possible to use separate display elements such as individual light-emitting diodes, etc., for the visual representation of the quantitative information.

It is advisable to assign a data storage device to the scale according to the invention to store the quantitative data representing the quantities of merchandise on hand. This data storage device can be installed in the scale itself. This embodiment is especially effective when only a few scales are present in the store and it is therefore not absolutely necessary to link the scales together to form a network. Especially when scales according to the invention are used in supermarkets, however, it has been found to be especially useful for the data storage device containing the quantitative data to be installed in a central data processing system. With this arrangement, the quantitative data can be updated centrally in the central data processing system, the quantitative data thus being updated every time a merchandise delivery arrives or a merchandise shipment leaves (to other branches), a job which would otherwise have to be performed at the scale itself. Entering the quantitative data at the scales themselves makes sense especially when the inventory data are intended to keep track of only certain articles.

As soon as a sales transaction is made, the quantitative data determined by the identification signals are called up from the data storage device and used to generate a display of the quantitative information. If the data storage device is at the scale itself, this call-up can be handled without any communication with the central data processing system or central merchandise management system. When a central data processing system is used, the identification signals are transmitted to the central system; the corresponding quantitative data are called up there and transmitted back to the scale, where the corresponding display of the quantitative information is produced. In the case of modern data processing systems, this procedure can take place very quickly, so that the result appears in the form of the desired representation of the quantitative information in no more than 0.5 second. As a result, it is ensured that the quantitative information is already displayed by the time the next sales transaction begins.

As already explained above, the quantitative data are advisably updated each time a sale is made. For this purpose, when the scales according to the invention are used, the weight of the sold merchandise is subtracted after each sale from the weight of the merchandise in question still on hand before this particular sale. This updating should preferably be performed only after the sales transaction has been confirmed by the clerk, e.g., after the clerk has entered the weighed quantity of merchandise into the system.

In an especially advantageous embodiment of the invention, quantitative information corresponding to the updated quantitative data is displayed after this confirmation procedure, which means that the sales clerk can monitor the effect of the sales transaction directly and initiate the acquisition of new merchandise if necessary.

For the purpose of generating the identification signals, the scale according to the invention can be equipped with an appropriate input unit. This input unit can comprise, for example, individual input keys or input fields for each article of merchandise to be sold. It is also possible, however, to use number blocks as an input unit, by means of which the information signals are generated by entering PLU numbers. It would also be possible, furthermore, to use combination types of input units, by means of which the information signals are generated for some of the articles by entering their corresponding PLU numbers and for other articles by actuating the corresponding input fields or keys, as described in, for example, WO 94/04,891. In addition or as an alternative, the input unit can also comprise a bar-code reader or a scanner.

As can be derived from the preceding explanation of scales according to the invention, a sales system according to the invention consists essentially of a scale of this type and a central data processing system for recording and processing the sales data transmitted to it by this scale, where the data storage device and/or the updating unit is installed in the central data processing system and where an input unit for entering the quantitative information can be assigned to the data storage device. It is also possible in particular to use a design in which the central data processing system itself is realized in the form of a scale according to the invention.

As can also be derived from the preceding explanation, a process according to the invention for the visual representation of merchandise-specific information content during a sales transaction, in the course of which process information content is displayed on the display unit of a sales device, this content being generated by the scale on the basis of merchandise-specific signals which include signals representing the weight of merchandise and on the basis of identification signals representing the type of merchandise being sold, is characterized essentially in that the scale generates a visual representation of quantitative information representing the existing quantity of merchandise of the type indicated by the identification signals. For this purpose, the merchandise-specific signals and/or the identification signals can be sent on to a central data processing system, and data corresponding to the information content to be represented can be generated in the central data processing system and sent back to the scale for the visual representation of the information content, i.e., the quantitative information.

In summary, it can be said that the idea of the invention consists in identifying the merchandise being offered for sale at a minimum of one sales station; in calling up data concerning the inventory of the identified merchandise; and in returning data on the weight or sale price of the identified merchandise together with data on the inventory back to the sales station itself, where the data required for the visual representation of the information content can be managed in the scales according to the invention themselves or in a separate merchandise management module of known design. If the calculation and data generation functions are carried out in the scales themselves, it is provided that the appropriate data are copied at freely selectable intervals such as hours, days, or weeks, from a central management module to the scales according to the invention . The central data processing system can be installed at any desired location, such as in a main warehouse, in a subsidiary warehouse, at a special input location, or even at one of the sales stations, where it can be maintained and updated.

What is claimed is:

1. Scale for use in the sale of merchandise in a store with a device comprising at least one weighing cell for generating signals representing the weight of the merchandise for the generation of merchandise-specific signals which include signals representing the weight, with a unit for generating identification signals representing the type of merchandise being sold, and with a display unit for generating a visual representation of information .content determined on the basis of the merchandise-specific signals and/or the identification signals, wherein the scale for generating a visual representation can be operated on the basis of the quantitative information representing the existing inventory quantity of the merchandise of the type indicated by the identification signals.

2. Scale according to claim 1, wherein the quantitative information is displayed by the display unit.

3. Scale according to claim 1, wherein a data storage device for storing quantitative data representing the existing inventory quantities of merchandise is assigned to the scale.

4. Scale according to claim 3, wherein an updating unit for updating the quantitative data during and/or after the sales transaction is assigned to the data storage device.

5. Scale according to claim 1, wherein a unit for indicating data indicating the type of merchandise, on the basis of which data the identification signals are generated.

6. Scale according to claim 1, wherein the device for generating merchandise-specific signals is designed to generate signals representing the sale price of the merchandise.

7. Sales system with a scale according to claim 1 and a central data processing system for recording and processing the sales data transmitted to it from the minimum of one scale.

8. Sales system according to claim 7, wherein the data storage device and/or the updating unit is provided in the central data processing system.

9. Sales system according to claim 7, wherein an input unit for entering the quantitative information is assigned to the data storage device.

10. Sales system according to claim 7, wherein the central data processing system is realized in the form of said scale.

11. Process for visually representing merchandise-specific information content during a sales transaction, in the course of which process information content is displayed on the display unit of a scale, this content being generated by the scale on the basis of merchandise-specific signals which include signals representing the weight of merchandise and identification signals representing the type of merchandise being sold, wherein the scale generates a visual representation of quantitative information representing the existing quantity of merchandise of the type indicated by the identification signals.

12. Process according to claim 11, wherein the merchandise-specific signals and/or the identification signals are transmitted to a central data processing system, and in that data corresponding to the information content to be represented are generated in the central data processing system and transmitted to the scale for the visual representation of the information content or quantitative information.

* * * * *